US005839540A

United States Patent [19]
Russell

[11] Patent Number: 5,839,540
[45] Date of Patent: Nov. 24, 1998

[54] COLLAPSIBLE FOLDING SAWHORSE

[76] Inventor: Douglass L. Russell, 5336 Neilsen Ave., Ferndale, Wash. 98248

[21] Appl. No.: 813,868

[22] Filed: Mar. 7, 1997

Related U.S. Application Data

[63] Continuation of Ser. No. 430,588, Apr. 28, 1995, Pat. No. 5,647,455.

[51] Int. Cl.[6] .......... F16M 11/00
[52] U.S. Cl. .......... 182/153; 182/153; 182/225
[58] Field of Search .......... 182/153, 181, 182/225; 248/166

[56] References Cited

U.S. PATENT DOCUMENTS

| | | | |
|---|---|---|---|
| D. 192,700 | 5/1962 | O'Connor | D54/1 |
| 2,900,158 | 8/1959 | Ditter | 248/166 |
| 3,148,746 | 9/1964 | Juculano | 182/153 |
| 3,276,545 | 10/1966 | D'Angelo | 182/153 |
| 3,286,752 | 11/1966 | Duryee, Jr. | 150/49 |
| 4,502,563 | 3/1985 | Pershon | 182/153 |
| 5,419,409 | 5/1995 | Corulla | 182/129 |

FOREIGN PATENT DOCUMENTS

| | | | |
|---|---|---|---|
| 221046 | 10/1958 | Australia | 182/181.1 |
| 252410 | 10/1960 | Australia . | |
| 223796 | 3/1962 | Australia | 182/153 |
| 529934 | 7/1954 | Belgium | 182/153 |
| 841348 | 6/1952 | Germany | 182/153 |
| 406173563 | 6/1994 | Japan | 182/153 |

*Primary Examiner*—Alvin C. Chin-Shue
*Attorney, Agent, or Firm*—Michael R. Schacht; Hughes & Schacht, P.S.

[57] ABSTRACT

A foldable sawhorse that can be shipped and stored in a small volume. The sawhorse comprises first and second leg assemblies and a plurality of spacing members. The leg assemblies are preassembled at the factory. The spacing members are bolted onto the leg assemblies by the end user. Hinges are formed by tubular hinge members attached to the upper ends of the leg members; the hinge members are either nested one within the other to form the hinge assembly, or separate pin members can be provided that extend through two hinge members. The sawhorse is inexpensive to manufacture and ship but sturdy and flexible in use.

6 Claims, 10 Drawing Sheets

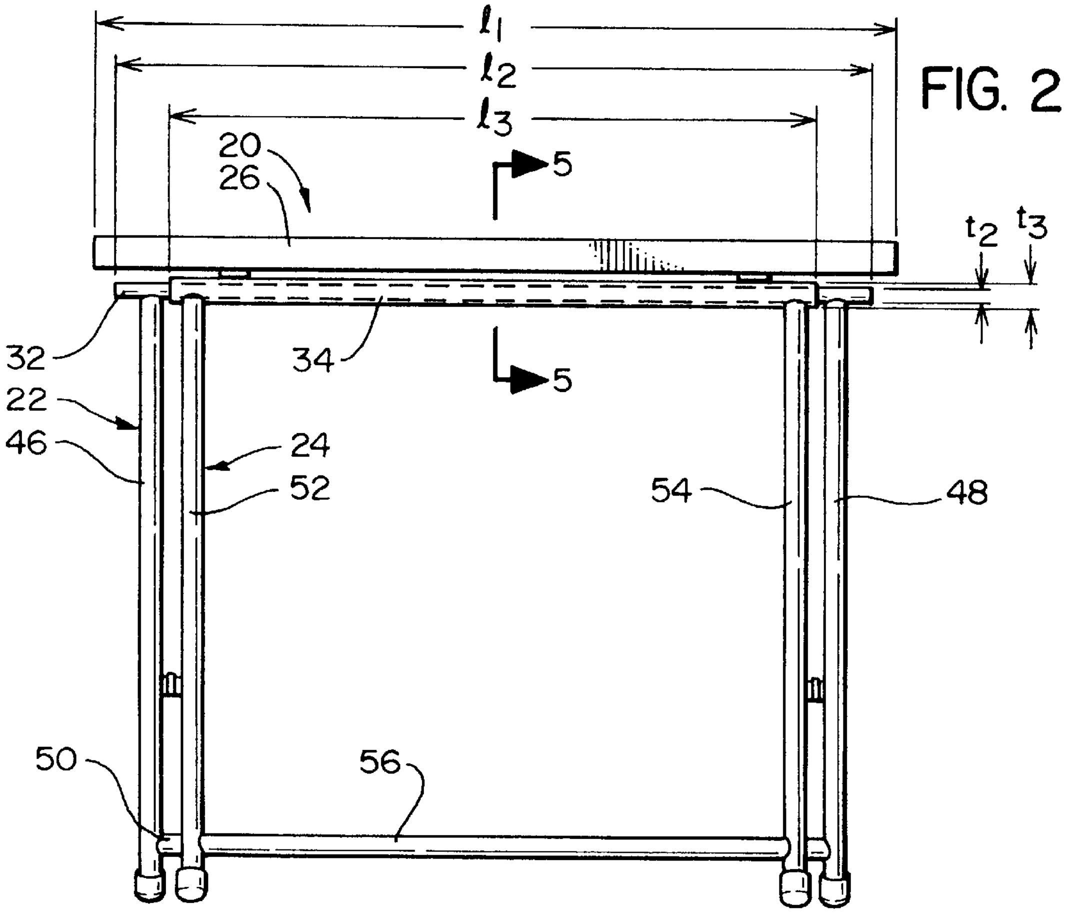
FIG. 2
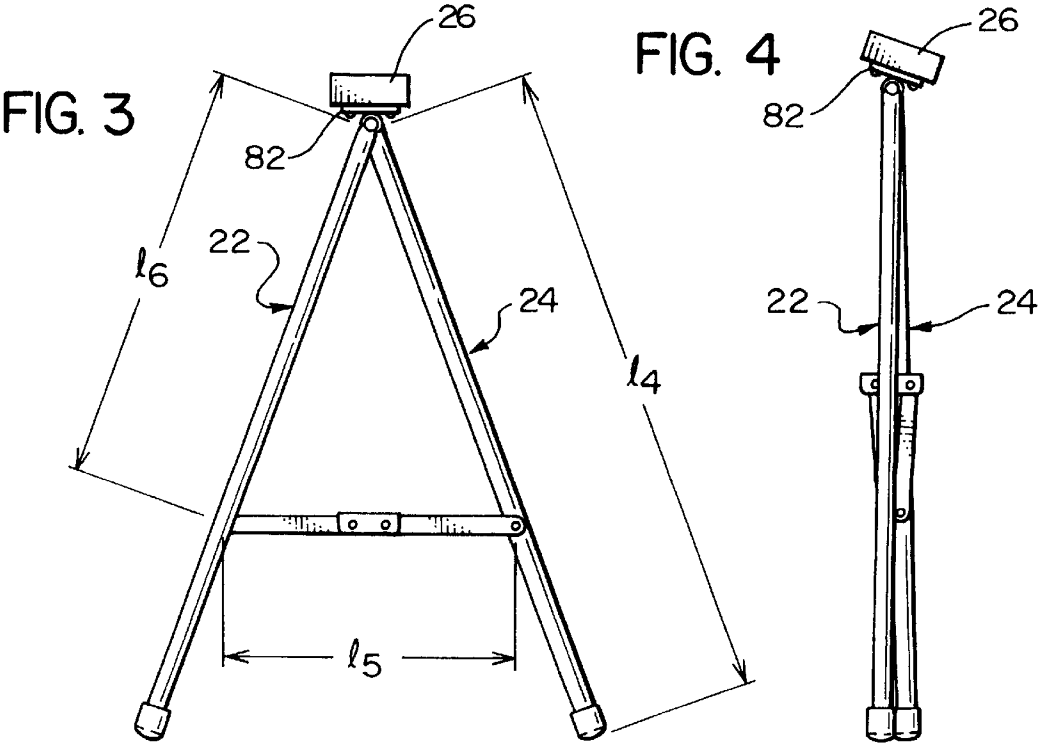
FIG. 3
FIG. 4

COLLAPSIBLE FOLDING SAWHORSE

RELATED APPLICATIONS

This is a continuation of U.S. Ser. No. 08/430,588 filed on Apr. 28, 1995, U.S. Pat. No. 5,647,455, issued Jul. 15, 1997, and a Provisional patent application, Attorneys' Ref. No. P4085, filed Jan. 6, 1997.

TECHNICAL FIELD

The present invention relates to sawhorses for supporting a workpiece and, more particularly, to sawhorses that fold for storage and transportation.

BACKGROUND OF THE INVENTION

Sawhorses have long been used in the industry to support a workpiece or work surface. Sawhorses generally come in pairs, with one of the two sawhorses supporting one end of the supported member and the other sawhorse supporting the other end of this member.

Sawhorses used in construction will generally comprise an uppermost engaging surface made out of wood. Wood is employed because the user will often cut the workpiece supported thereby with an electric saw or the like, and such saws may penetrate the workpiece and cut into the engaging member of the sawhorse. By making this engaging member out of wood, damage to the tool being used is substantially reduced.

The most common type of sawhorse available is formed out of five separate pieces of wood, usually in standard 2×4 dimensions, that are joined by metal brackets. The end user will simply purchase the brackets and cut 2×4s to form four legs and the engaging member described above.

Numerous other variations on the basic sawhorse are known. In particular, the brackets employed to attach the leg members to the engaging member often incorporate hinges to allow the leg members to be collapsed into a closed position for storage. These hinges generally constitute a weak point in the design of the sawhorse, resulting in the sawhorse forming an unstable work surface and not being very durable. The need thus exists for a folding sawhorse that provides a stable support for a workpiece and which is durable in use.

OBJECTS OF THE INVENTION

From the foregoing, it should be clear that one primary object of the invention is to provide improved methods and devices for supporting workpieces.

Another more specific object of the present invention is to obtain methods and apparatus for supporting a workpiece or work surface that exhibit a favorable mix of the following characteristics:

(a) spaces an engaging member from the ground in a stable manner;

(b) can collapse when not in use for storage;

(c) is easily moved between the collapsed and open positions;

(d) has high load-bearing capacity;

(e) is durable and rugged in operation;

(f) may be fully disassembled for shipment and storage; and (g) is relatively inexpensive to manufacture.

SUMMARY OF THE INVENTION

These and other objects are obtained by the present invention which basically comprises a folding sawhorse in which a hinge portion thereof is formed by two elongate tubular members, one nested inside the other. The legs are attached to these tubular members such that rotation of the inner tubular member relative to the outer tubular member causes the legs to move between opened and closed positions. A hinge mechanism formed in this manner is very durable, and has high load-bearing capacity.

An engaging member, normally formed out of wood or other material which will not damage tools used in conjunction with the sawhorse, is attached to the outer tubular member. This engaging member is oriented relative to the outer tubular member and the legs attached thereto such than an upper surface thereof is substantially horizontal when the sawhorse is in the open position.

Additionally, locking assemblies are employed between opposing legs on each end to allow these legs to be locked into the open position.

In a preferred form, the inner tubular member is longer than the outer tubular member. Two of the legs on one side of the sawhorse are attached to the ends of the inner tubular member such that the outer tubular member is arranged between these legs. The other two legs on the other side of the sawhorse are attached to the ends of the outer tubular member. In this manner, when the sawhorse is in the collapsed position, all four legs may be arranged in substantially the same plane to reduce the storage space required. Also, this arrangement allows two sawhorses in the open position to be placed right next to each other with the outer legs of one sawhorse straddling the inner legs of the other sawhorse.

In use, the sawhorse will normally start in the closed position. The user need only grab the engaging member and twist it such that the legs attached to the outer tubular member are rotated away from the legs attached to the inner tubular member. When the legs reach the open position, the locking assemblies will snap into place and lock the legs into the open position. This allows the sawhorse to be placed into the open position using only one hand, which is of great value in a work environment as the other hand may often be occupied with tools, tool boxes, and the like.

Additionally, to improve the load-bearing capacity of the sawhorse, spacing members may be provided which extend between the legs on one side of the sawhorse. In particular, a spacing member may be attached to the lower ends of the two legs attached to the inner tubular member, and another spacing member may be attached to the lower ends of the two legs attached to the outer tubular member. With this arrangement, the legs will not all lie in exactly the same plane when the sawhorse is in the closed position, but they will still take up very little room. Other advantages of the present invention will become apparent from the following detailed discussion.

BRIEF DESCRIPTION OF THE DRAWINGS

FIG. 2 is a side elevational view of the sawhorse depicted in FIG. 1;

FIG. 3 is an end view showing the sawhorse of FIGS. 1 and 2 in the open position;

FIG. 4 is an end view of the sawhorse shown in FIGS. 1 and 2 shown in a closed position;

FIG. 18 is a section view of a hinge assembly taken along lines 19—19 in FIG. 15.

DETAILED DESCRIPTION OF THE INVENTION

Figure 1:
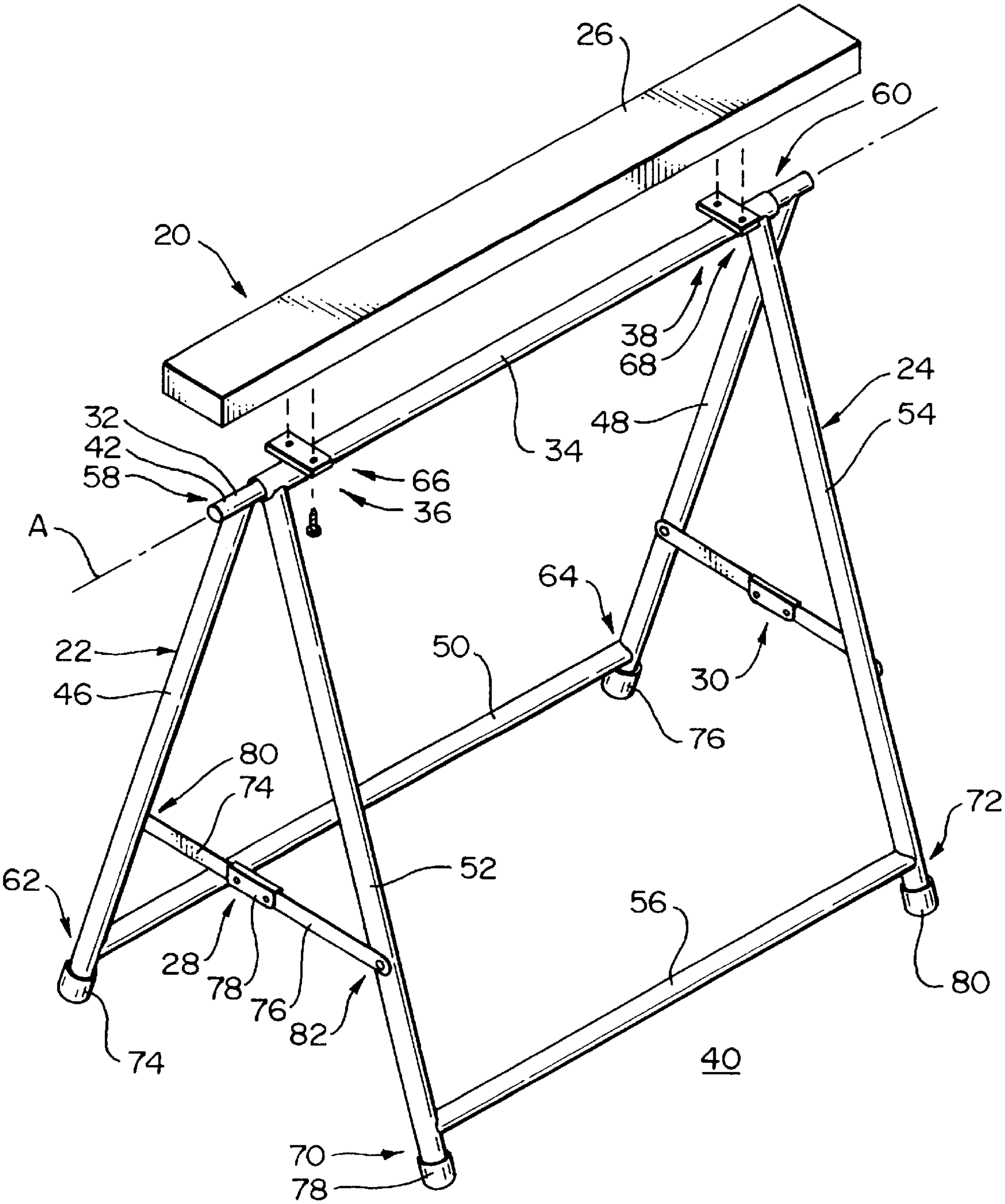
FIG. 1 is a perspective, partial exploded view of a sawhorse embodying the principles of the present invention.

Referring now to the drawing, depicted therein at FIG. 1 is an exemplary sawhorse 20 constructed in accordance with, and embodying, the principles of the present invention. This sawhorse 20 comprises a first leg structure 22, a second leg structure 24, an engaging member 26, and first and second locking assemblies 28 and 30. The first leg structure 22 comprises an inner hinge member 32, while the second leg structure 24 comprises an outer hinge member 34.

The sawhorse 20 is constructed such that the inner hinge member 32 is nested within the outer hinge member 34 in a manner that allows the first and second leg structures 22 and 24 to rotate relative to each other about a pivot axis A. The locking assemblies 28 and 30 extend between the leg structures 22 and 24 and move between a locked position in which the leg structures are in an open configuration as shown in FIG. 1 and an unlocked position in which the leg members are free to rotate towards each other from the open configuration. The engaging member 26 is attached to the outer hinge member 34 by first and second attachment assemblies 36 and 38.

When in the open configuration shown in FIG. 1, the first and second leg structures 22 and 24 engage the ground or floor 40 to space the engaging member 26 from the ground or floor 40. The engaging member 26 thus forms a stable support surface for a workpiece, platform, or other member.

As discussed briefly above, the inner hinge member 32 is nested within the outer hinge member 34. The outer hinge member 34 is formed by a hollow, cylindrical tube or the like made out of substantially rigid material such as steel, plastic, or the like (see Table 2 below). The inner hinge member 32 is also generally cylindrical and has an outer diameter that is slightly smaller than the inner diameter of the outer hinge member 34.

Figure 5:
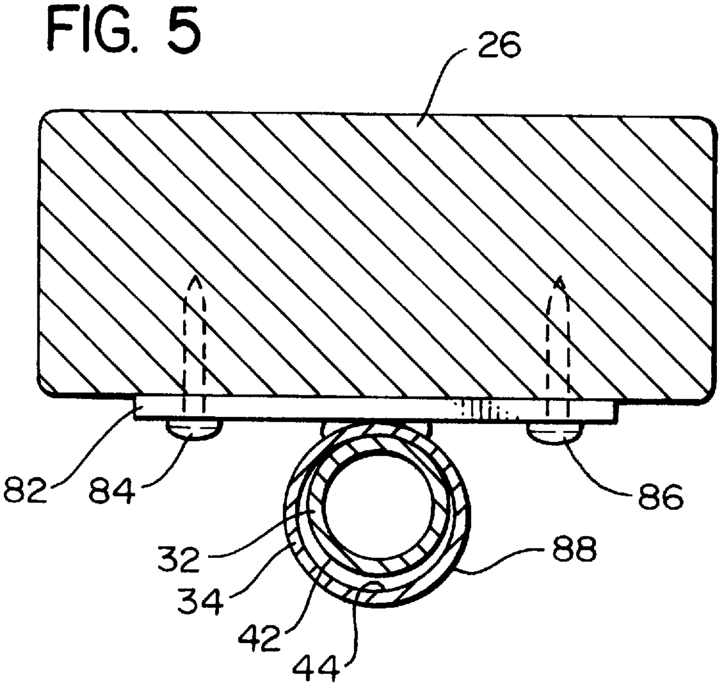
FIG. 5 is a section view taken along lines 5—5 in FIG. 2 showing details of the tubular members which form a hinge portion of the sawhorse and the method by which an engaging member is attached to the sawhorse.

As perhaps best shown in FIG. 5, in use an outer surface 42 of the inner hinge member 32 engages an inner surface 44 of the outer hinge member 34. By this means, loads are transferred from the engaging member 26 through the attachment assemblies 36 and 38, through the outer hinge member 34 and to the inner hinge member 32 and thus the first leg structure 22. Additionally, as the inner hinge member 32 engages the outer hinge member 34 along the entire length of this member 34, the loads transferred between the hinge members 32 and 34 are borne across a relatively large area. Further, given the inherent rigidity provided by the cylindrical hinge members 32 and 34, the hinge function performed by these members 32 and 34 is very stable and durable.

Referring now to FIGS. 3 and 4, it can be seen that the engagement of the inner hinge member 32 with the outer hinge member 34 allows the leg structures 22 and 24 to rotate between an open configuration (FIG. 3) and a closed configuration (FIG. 4). It should be noted that hinge members 32 and 34 need not be cylindrical, and the inner hinge member 32 need not be hollow, to perform the function as described with reference to FIGS. 3, 4, and 5. To the contrary, the sawhorse 20 would function basically as described with other cross-section configurations such as rectangular, ovoid, triangular, etc. However, the cylindrical configuration shown in the drawings is preferred as this configuration will provide the least amount of resistance to the rotation of the inner hinge member 32 relative to the outer hinge member 34 and can be formed of readily available parts.

Referring now back to FIG. 1 for a moment, the construction and operation of the sawhorse 20 will be described in further detail. Referring initially to the first leg structure 22, FIG. 1 shows that, in addition to the inner hinge member 32, the structure 22 comprises a first leg member 46, a second leg member 48, and a spacing member 50. Similarly, the second leg structure 24 comprises a first leg member 52, a second leg member 54, and a spacing member 56.

FIG. 1 also shows that the inner hinge member 32 forming a part of the first leg structure 22 is longer than the outer hinge member 34 forming a part of the second leg structure 24. The first leg member 46 of the first leg structure 22 is securely attached to a first end 58 of the inner hinge member 32. This attachment is preferably formed by welding or the like, but may be formed by a mechanical structure such as a bolt or a chemical structure as an adhesive.

The second leg member 48 of the leg structure 22 is similarly attached to a second end 60 of the inner hinge member 32. The spacing member 50 is connected between lower ends 62 and 64 of the first and second leg members 46 and 48.

During assembly of the first leg structure 22, the outer hinge member 32 is first placed over the inner hinge member 42 such that, when the leg members 46 and 48 are attached to the hinge member 32, the outer hinge member 34 is arranged around the inner hinge member 32 and between the leg members 46 and 48. The outer hinge member 34 thus may not be removed from the inner hinge member 32 without removing at least one of the legs 46 and 48 therefrom.

Although not necessary, production and use of the sawhorse 20 is simplified if the inner hinge member 32 is parallel to the spacing member 50, the leg members 46 and 48 are parallel, and the leg members 46 and 48 extend at a right angle from the inner hinge member 32 and spacing member 50. The resulting leg structure 22 is generally rectangular in shape with a large opening in the middle, although other configurations such as trapezoidal may be adapted for this intended purpose.

The second leg structure 24 is similarly configured, although slightly smaller in overall size because the outer hinge member 34 is shorter than the inner hinge member 32. In particular, the first leg member 52 is connected to a first end 66 of the outer member 34, while the second leg member 54 is connected to a second end 68 of the outer hinge member 34. The spacing member 56 is connected between lower ends 70 and 72. With the first and second leg members 52 and 54, again, the exact shape of-the second leg structure 24 is somewhat arbitrary, but the generally rectangular shape of the preferred sawhorse 20 simplifies manufacture and use of the sawhorse 20.

The locking assemblies 28 and 30 are identical and only the locking assembly 28 will be described herein in detail. The locking assembly 28 comprises a first rigid member 74, a second rigid member 76, and a sleeve member 78. A first end 80 of the locking assembly 28 is rotatably attached to the first leg member 46 of the first leg structure 22. A second end 82 of the locking assembly 28 is similarly rotatably attached to the first leg member 52 of the second leg structure 24.

The sleeve member 78 is pivotally attached both to the rigid member 74 and the rigid member 76 such that, when the locking assembly 28 is connected between the leg members 46 and 52, the sleeve member 78 engages the rigid members 74 and 76 to maintain the locking assembly 28 in a locked position whereby the ends 80 and 82 thereof are spaced a fixed distance apart. In this locked position, the sleeve member 78 cannot move downwardly.

However, to move the locking assembly 28 into an open position, the sleeve member 78 is raised. This allows the ends 80 and 82 of the locking assembly to move together, thereby allowing the leg members 46 and 52 connected thereto also to move together. Thus, the leg structures 22 and 24 may rotate towards each other into the closed position shown in FIG. 4. Other locking assemblies that perform the same function are well-known in the art. And, given the applicant's disclosure herein, it would be clear that other known locking assemblies may be substituted for the exemplary assemblies 28 and 30.

Referring again to FIG. 1, it can be seen that ground engaging members 74, 76, 78, and 80 are placed on the leg members 46, 48, 52, and 54, respectively. These ground engaging members 74, 76, 78, 80 are made of resilient material to prevent the rigid leg members 46, 48, 52, 54 from scratching the surface 40 on which the sawhorse 20 is placed.

Referring now to FIGS. 1 and 5, depicted therein in detail are the attachment assemblies 36 and 38 employed to fasten the engaging member 26 onto the outer hinge member 34. These attachment assemblies 36 and 38 are identical, and only the assembly 38 will be descried herein in detail.

The attachment assembly 38 basically comprises an attachment plate 82 welded or otherwise securely affixed to the outer hinge member 34. The assembly 38 further comprises screws 84 and 86 which extend through the attachment plate 82 and into the engaging member 26. This attachment assembly 38 thus allows the engaging member 26 to be securely fastened to the outer hinge member 34 but still reduces the likelihood that a tool such as a saw used in conjunction with the sawhorse 20 will become damaged.

It should be recognized that, while the exemplary sawhorse 20 employs a flat plate with screws extending therethrough to form the attachment assembly 38, given the teachings of the present application, one of ordinary skill in the art would recognize that a number of other methods may be used to fasten the engaging member 26 onto the outer hinge member 34.

These alternative methods would include a tray having peripheral flanges that extend upward along the engaging member 26, with screws horizontally extending through these flanges into the engaging member 26, a clamp assembly which does not physically penetrate the engaging member 26, forming spikes on an outer surface 88 of the outer hinge member 34 that extend into the engaging member 26 and any other arrangement by which a wooden engaging member can be attached to a member that performs the function of the outer hinge member 34.

Additionally, FIGS. 3 and 4 show that the attachment plate 82 extends at an angle relative to the plane of the second leg structure 24. This angle is determined such that the attachment plate 82 is substantially horizontal when the sawhorse 20 is in use.

Figure 6:
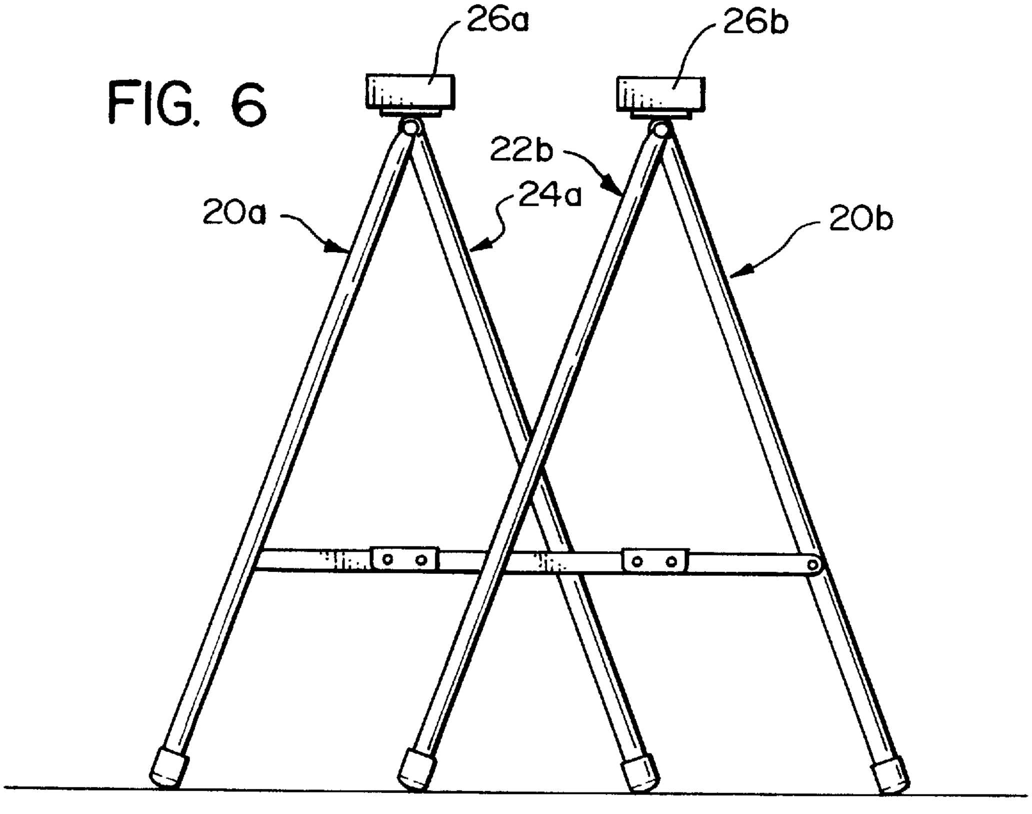
FIG. 6 is an end view of two sawhorses shown arranged adjacent to each other such that the legs of one of the sawhorses are nested within the legs of the other of the sawhorses.

Referring now to FIG. 6, depicted therein are first and second sawhorses **20*a* and 20*b* constructed in the same manner as the sawhorse 20 described above. The sawhorses 20*a* and 20*b* are shown arranged next to each other such that the second leg structure 24*a* of the first sawhorse 20*a* is nested within the first leg structure 22*b* of the second sawhorse 20*b*. This arrangement allows the engaging members 26*a* and 26*b* of the sawhorses 20*a* and 20*b*** to be arranged very close to each other to accommodate very narrow or small workpieces.

Attached herewith are two tables defining certain parameters to the present invention. The first table relates to certain dimensions $l_1$ through $l_6$ and $t_1$ through $t_3$ identified in the drawings. The dimensions $l_1$ through $l_6$ are lengths of indicated components in inches, while the dimensions $t_1$ through $t_3$ are inner diameters of certain specified tubular members. Table 1 contains the actual values for the currently preferred embodiment, a first preferred range of values, and a second preferred range of values. Table 2 comprises the preferred material selected for certain of the components identified by reference characters in the first column as well as known alternates to the preferred materials.

Referring now to FIGS. 7–13, depicted at 120 therein is yet another embodiment of a folding sawhorse constructed in accordance with, and embodying, the principles of the present invention.

The sawhorse 120 depicted in FIGS. 7–13 is similar in operation to the sawhorse 20 described above. A primary difference between these sawhorses 20 and 120 is that the sawhorse 120 is collapsible to a degree beyond that of the sawhorse 20.

Figure 13:
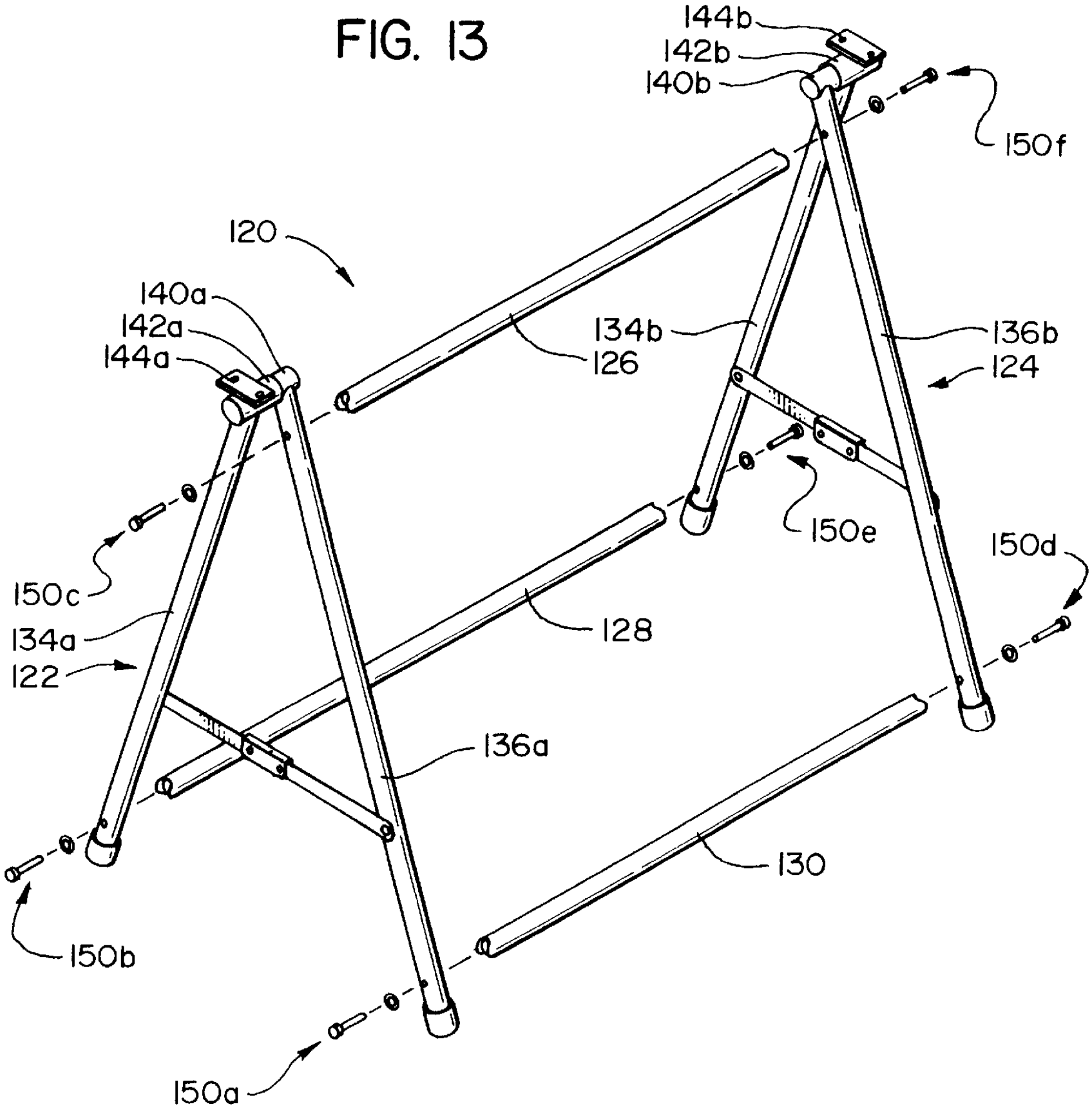
FIG. 13 is an exploded view similar to what is shown in FIG. 7.

In particular, as shown in FIG. 13, the sawhorse 120 can be disassembled into a number of components; these components may be stored and shipped in a box having a volume approximately 1/10th of that of the box required to store and ship the sawhorse 20 described above.

The sawhorse 120 may thus be in disassembled configuration or an assembled configuration. When in its assembled configuration, it can be opened into an operational configuration (FIG. 9) or folded for storage into an intermediate configuration (FIG. 10) in a manner similar to that of the sawhorse 20 described above.

The sawhorse 120 comprises first and second leg assemblies 122 and 124, an upper leg spacer 126, first and second lower leg spacers 128 and 130, and a cutting board 132. The upper leg spacer 126 and second lower leg spacer 130 have a first predetermined length, and the first lower leg spacer has a second predetermined length. The second predetermined length is longer than the first predetermined length by a third predetermined distance. The third predetermined distance is determined by the particulars of the hinge assemblies that will be described below.

The first and second leg assemblies 122 and 124 are almost identical, and only the first leg assembly 122 will be described in detail herein. The second leg assembly 124 will be described herein only to the extent that it differs from the assembly 122.

The first leg assembly 122 comprises an outer leg member 134*a*, an inner leg member 136*a*, a brace assembly 138*a*, an inner hinge member 140*a*, an outer hinge member 142*a*, and a mounting plate 144*a*. The inner hinge member 140*a* is welded to an upper end of the inner leg member 136*a*, and the outer hinge member 142*a* is welded to an upper end of the outer leg member 134*a*. The hinge members 140*a* and 142*a* are sized and dimensioned such that the inner hinge member 140*a* fits within a bore 146*a* of the outer hinge member 142*a*. The mounting plate 144*a* is welded to the outer hinge member 142*a*. The brace assembly 138*a* is connected to the leg members 134*a* and 136*a* by rivets 148.

The primary difference between the leg assemblies 122 and 124 is that the leg assembly 124 is a mirror image of the leg assembly 122 when the sawhorse 120 is assembled.

The spacers 126, 128, and 130 are bolted to the leg assemblies 122 and 124 to space these assemblies 122 and 124 a predetermined distance from each other. The cutting board 132 is attached by fasteners to the mounting plates 144 and thus also spaces the leg assemblies 122 and 124 the predetermined distance from each other.

During manufacture, the leg assemblies 122 and 124 are formed as described above. The spacers 126–30 and cutting board 132 are also provided, but are not bolted to the leg assemblies 122 and 124. Instead, these components 122–130 are placed in an elongate box along with the hardware necessary to join them together into the final sawhorse 120. This elongate box is then shipped to the retailer and stored prior to sale.

The end user will then purchase the sawhorse 120 in its elongate shipping container and take it home for final assembly as shown in FIG. 13. This assembly is not too difficult for the average end user, but the retailer may offer to perform this assembly for a small fee.

The end user will likely not disassemble the sawhorse 120 into is component parts, instead simply using and storing the sawhorse 120 in the same basic manner as the sawhorse 20 described above. But in some circumstances the end user may want to disassemble the sawhorse 120 into its original state for shipping or long-term storage.

Figure 8:
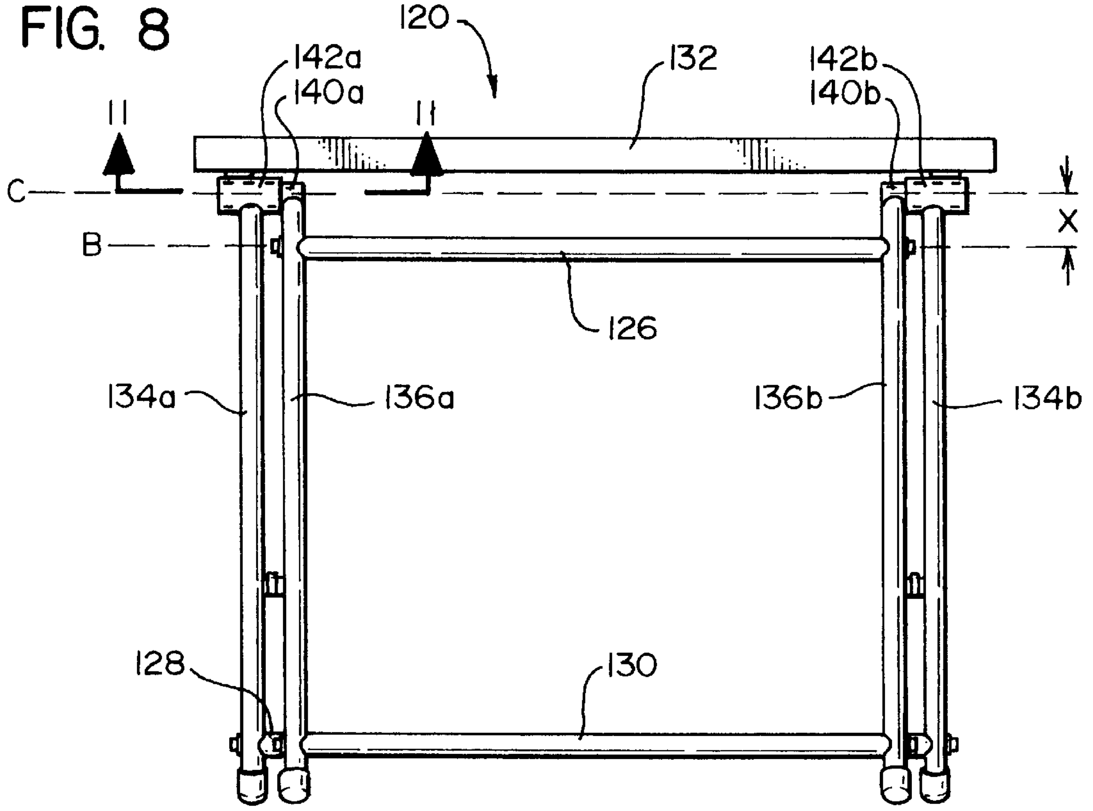
FIG. 8 is side elevational view of the sawhorse depicted in FIG. 7.

With the foregoing general understanding with the construction and operation of the sawhorse 120 in mind, the following discussion will describe certain features of this sawhorse 120 in further detail. Referring initially to FIG. 8, it can be seen that a longitudinal axis B of the upper leg spacer 126 is offset below a longitudinal axis C extending through the hinge members 140 and 142 by a distance X. The upper leg spacer 126 is thus significantly below the cutting board 132; if a saw penetrates through the cutting board 132, it will not come into contact with the upper leg spacer 126 under most conditions. The assembly of the sawhorse 120 thus decreases the chance that a saw will cut into metal components thereof.

Figure 7:
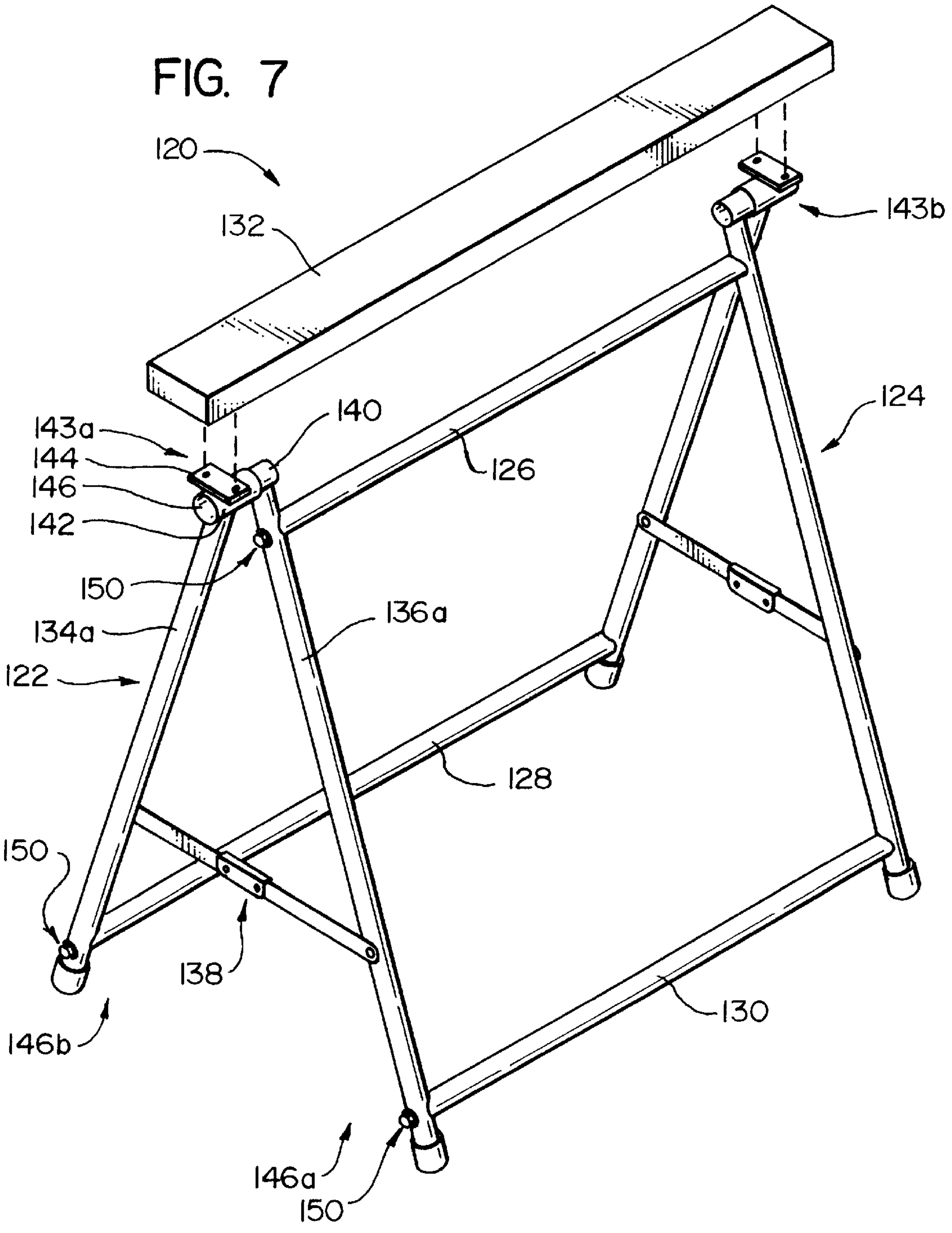
FIG. 7 is a perspective view of a second embodiment of a folding sawhorse constructed in accordance with the present invention.

FIGS. 7 and 8 also show that the inner leg members 136 are connected at top and bottom by the upper leg spacer 126 and the second lower leg spacer 130. This ensures that the inner hinge members 140*a* and 140*b* remain a fixed distance apart as long as the leg spacers 126 and 130 are securely bolted to the inner leg members 136*a* and 136*b*.

The outer leg members 134*a* and 134*b* are connected by the first lower leg spacer 128 at the bottom and, at top, by the cutting board 132.

The arrangement ensures that the inner hinge members 140*a* and 140*b* are spaced from each other a predetermined distance. Similarly, the outer hinge members 142*a* and 142*b* are spaced from each other a slightly larger distance. With the inner hinge member 140*a* inside the outer hinge member 142*a* and the inner hinge member 140*b* in the outer hinge member 142*b*, a hinge assembly is formed that allows the leg members 134 and 136 to rotate relative to each other about the axis C.

Figure 11:
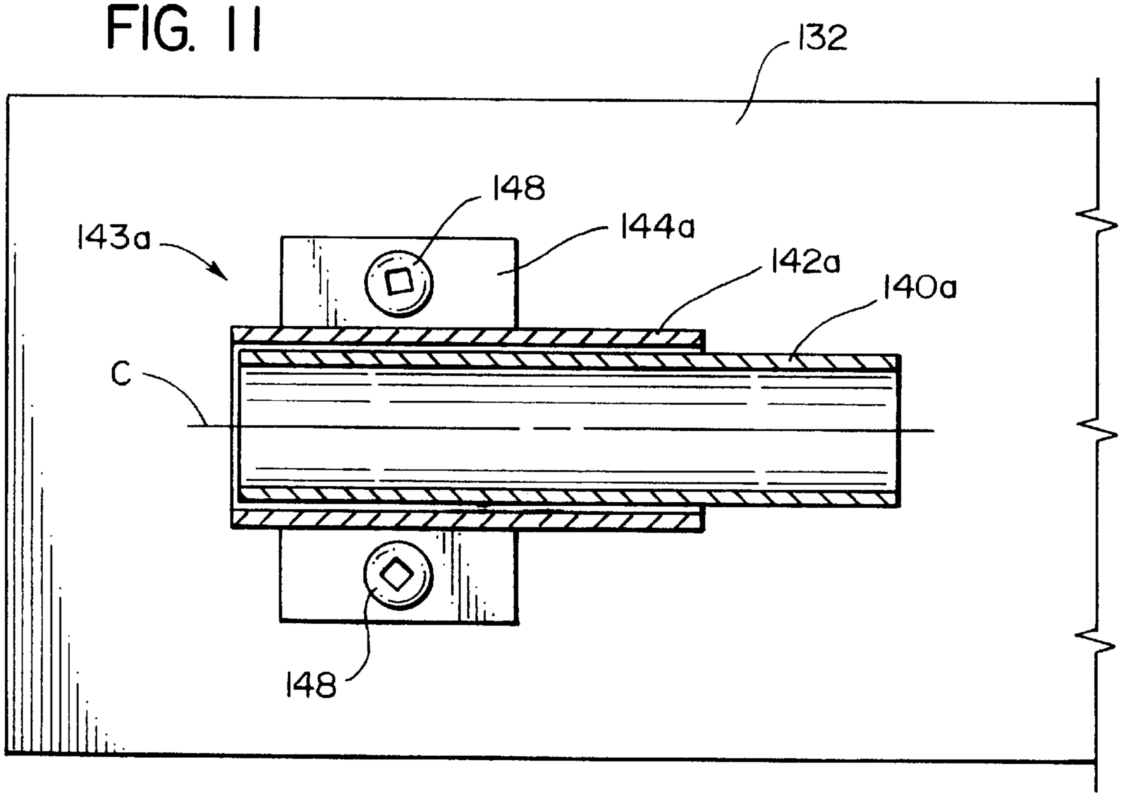
FIG. 11 is a partial cut away view taken along lines 11—11 in FIG. 8.

Referring now for a moment to FIG. 11, it can be seen that hinge members 140*a* and 142*b* form a hinge assembly 143*a*. A similar hinge assembly 143*b* (FIG. 7) is formed by the hinge members 140*b* and 142*b*. FIG. 11 also shows that the inner hinge member 140 is approximately 30 percent longer than the outer hinge member 142. And when the sawhorse 120 is assembled as shown in FIG. 7 to form the hinge assemblies 143, the outer hinge members 142 overlap approximately 70 percent of the inner hinge members 140.

These hinge members 140 and 142 rotate relative to each other to form the hinge assemblies 143*a* and 143*b*, and these hinge assemblies will be stable even if one of the outer hinge members 142 is displaced from the other outer hinge member 142 a distance less than the length of the outer hinge member.

To strengthen the folding sawhorse 20, a second upper leg spacer (not shown) may be provided between the outer leg members 134*a* and 134*b* at the same vertical location as the upper leg spacer 126. The addition of a fourth leg spacer will slightly increase the overall cost of the sawhorse 120.

Figure 9:
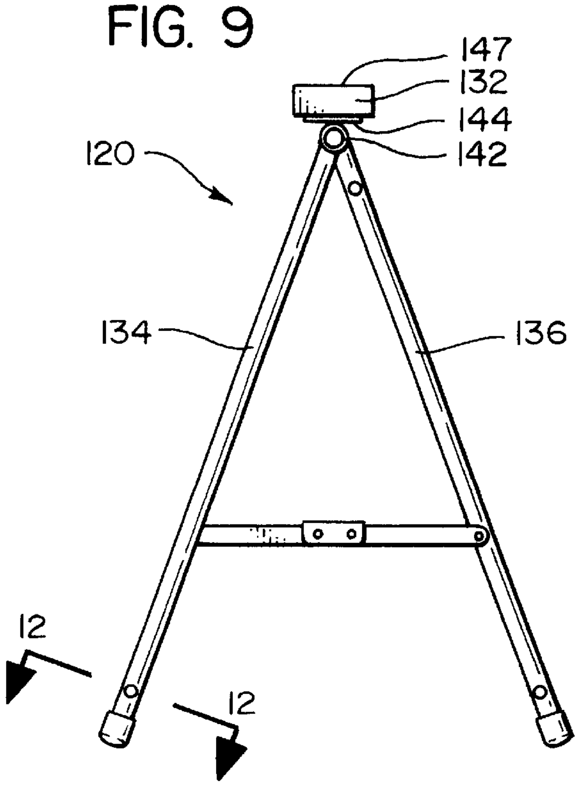
FIG. 9 is an end elevational view of the sawhorse depicted in FIG. 7.
Figure 10:
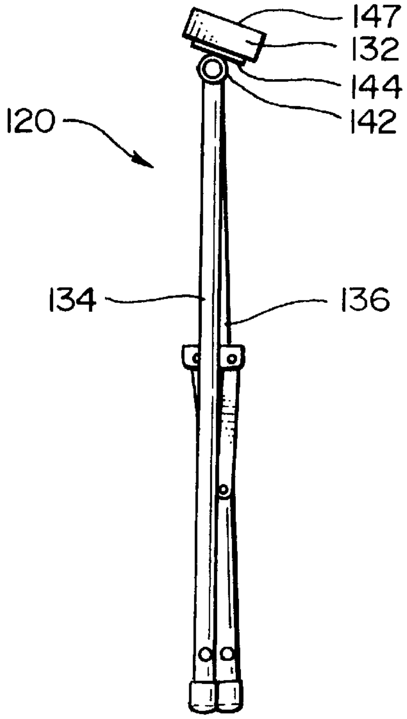
FIG. 10 is a view similar to that of FIG. 9 of the sawhorse in its folded position.

Referring now to FIGS. 9 and 10, these figures illustrate how the hinge assemblies 143*a* and 143*b* allow the sawhorse 120 to be placed in an operational position (FIG. 9) and collapsed for storage in an intermediate, or collapsed, position (FIG. 10). The sawhorse 120 is in its fully disassembled configuration when the various leg spacers are unbolted from their corresponding leg members as shown in FIG. 13; this allows the sawhorse 120 to be placed in a relatively small box for shipping, retail display and sale, and long-term storage.

FIG. 10 also shows that the mounting plates 144 are welded to the outer hinge members 142 such that these plates 144 extend at an angle with respect to the longitudinal axes of the outer leg members 134. This ensures that a support surface 147 on the cutting board 132 is substantially horizontal when the sawhorse 120 is placed in its operational configuration on a horizontal surface.

Referring again for a moment to FIG. 11, it can be seen that screws 148 extend through the mounting plate 144 and into the cutting board 132 to attach the outer hinge members 142 to the cutting board 132.

Figure 12:
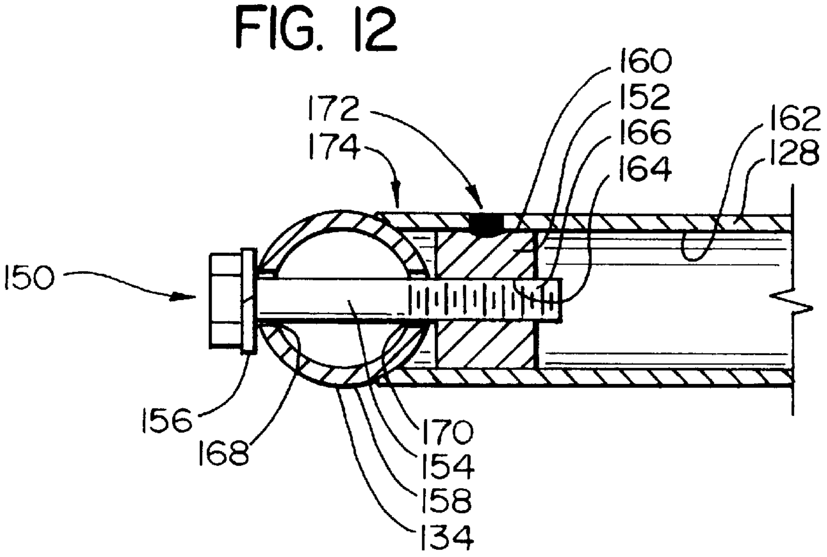
FIG. 12 is a partial cut away view taken along lines 12—12 in FIG. 9.

Referring now for a moment to FIG. 12, depicted therein is a bolt assembly 150 that can be used to attach the leg spacers to the leg members. In particular, the attachment assembly 150 comprises a cylindrical threaded block 152, a bolt 154, and a spacer 156. As perhaps is best shown in FIG. 13, the ends of the leg spacers 126, 128, and 130 are cut such that they conform to a cylindrical outer surface 158 of the leg members 134 and 136.

The block 152 has a cylindrical outer surface 160 sized and dimensioned to be snugly received within a cylinder defined by an inner surface 162 of the leg spacer 130. The block 152 further comprises a threaded inner surface 164 adapted to engage a threaded portion 166 of the bolt 154. Holes 168 and 170 are formed in the leg member 136 at the location where the leg brace 130 is to be attached thereto. A weld is formed at a location identified by reference character 172 to secure the block 142 within the leg member 130.

Accordingly, to assemble the brace member 130 to the leg member 136, an end 174 that is cut to the contour of the outer surface 158 of the leg member 136 is brought into contact with this surface 158 such that the threaded surface 164 is aligned with the holes 168 and 170. The bolt 154 is then inserted through the washer 156 and then the holes 168 and 170 until its threaded end 166 engages the threaded surface 164. The bolt 154 is then axially rotated until the leg member 136 is snugly held against the brace member 130.

It should be clear that this attachment system can, and in the exemplary folding sawhorse 120 is, used at each of the junctures between a leg member and a leg brace member.

Referring now for a moment to FIG. 13, the assembly of the sawhorse 120 from its shipping configuration to its intermediate configuration will be described in further detail.

Excluding bolts and washers, when the sawhorse 120 in its completely disassembled state is removed from its box, five members or subassemblies are provided: the first leg assembly 122, the second leg assembly 124, the upper leg spacing member 126, and the first and second lower leg spacing members 128 and 130.

The first step in the assembly process is to attach the ends of the leg spacing members 126, 128, and 130 to the appropriate locations on the leg members 134*a*, 136*a*, 134*b*, and 136*b*. This can be accomplished by using the attachment assemblies such as the assembly 150 described above, and these connections can be made in almost any order.

Attaching leg spacers 126 and 130 to the inner leg members 136*a* and 136*b* forms a first rigid assembly 146*a*, while attaching the leg spacer 128 to the outer leg members 134*a* and 134*b* forms a second rigid assembly 146*b*. The first rigid assembly 146*a* should be constructed first, and the second rigid assembly 146*b* should be constructed only after the inner hinge members 140*a* and 140*b* are placed within the outer hinge members 142*a* and 142*b*.

Next, the cutting board 132 is attached to the mounting plates 144*a* and 144*b* using the screws 148 as described above. The step of attaching the cutting board 132 should be performed after the step of constructing the rigid assemblies 146*a* and 146*b*. The cutting board 132 can be attached to the mounting plates 144*a* and 144*b* before the rigid assemblies 146*a* and 146*b* are formed, but this requires careful measurement to ensure that the mounting plates 144*a* and 144*b* are attached to the cutting board 132 at the appropriate locations. The sawhorse 120 may then be used as described above.

Figure 14:
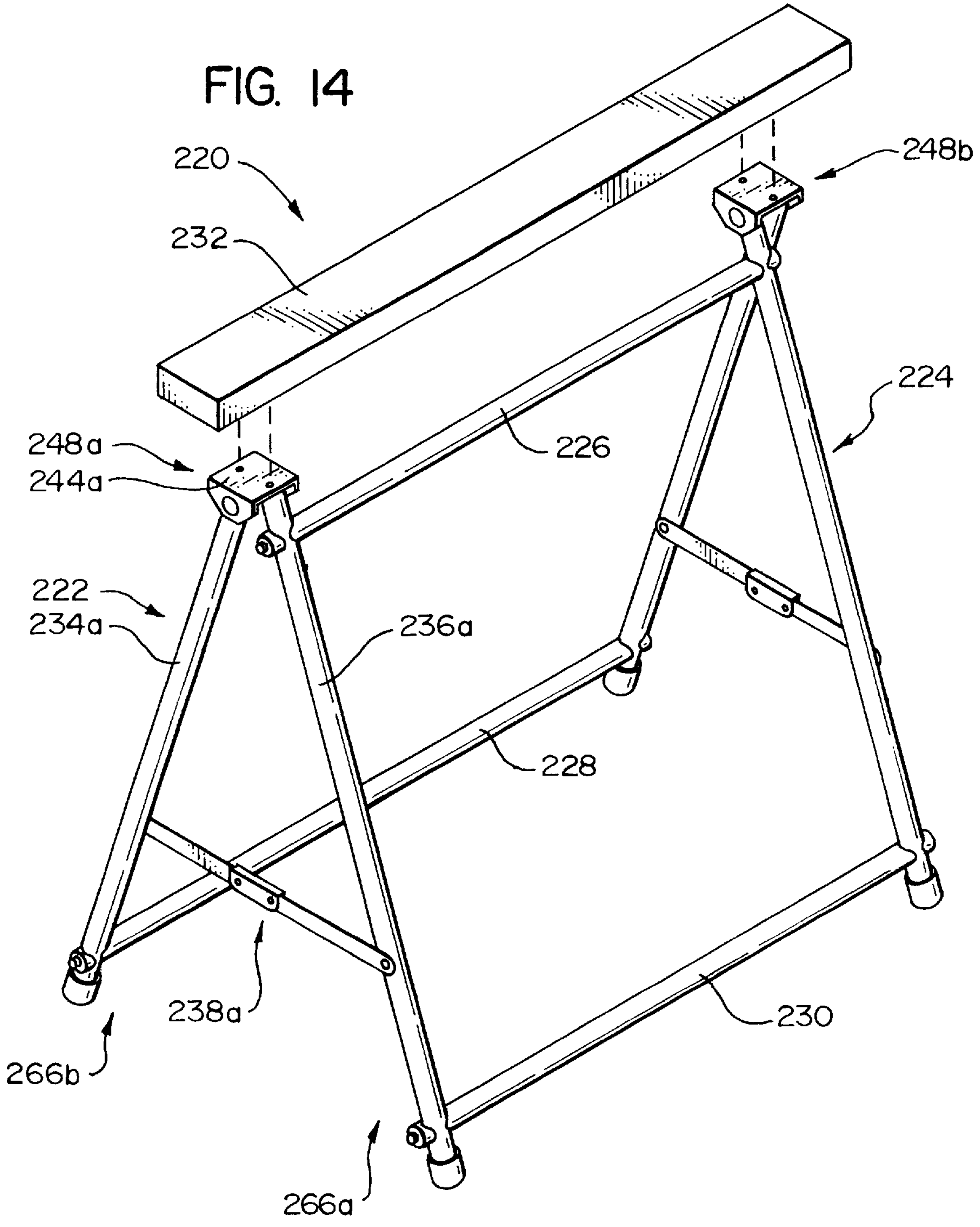
FIG. 14 is a perspective, partially exploded view depicting yet another exemplary sawhorse constructed in accordance with the present invention.

Referring now to FIG. 14, depicted therein is yet another exemplary folding sawhorse 220 constructed in accordance with, and embodying, the principles of the present invention. The sawhorse 220, when fully assembled, can be used in the same manner as the sawhorse 120 described above; but, like the sawhorse 120 described above, the sawhorse 220 is collapsible between operational and intermediate configurations and can be fully disassembled. In its fully disassembled configuration, the sawhorse 220 can be stored and transported in a volume approximately the same as that of the sawhorse 120 in its fully disassembled state.

The sawhorse 220 comprises first and second leg assemblies 222 and 224, an upper leg spacer 226, first and second lower leg spacers 228 and 230, and a cutting board 232.

Figure 15:
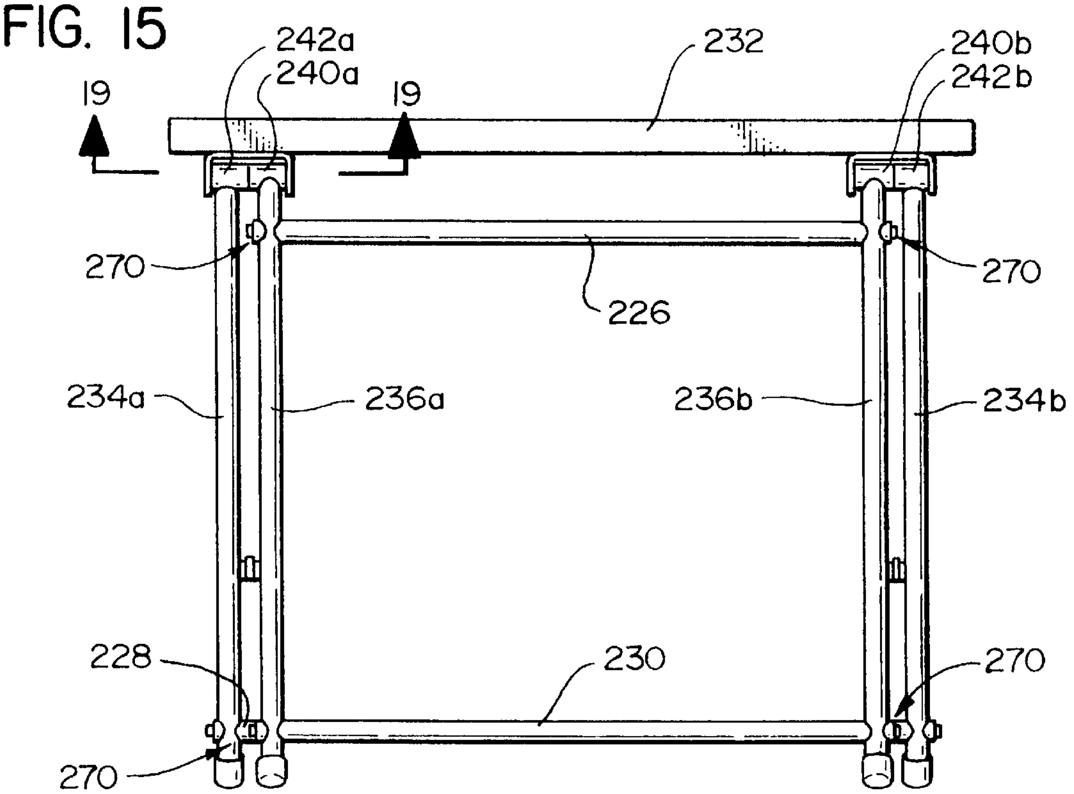
FIG. 15 is a side elevational view of the sawhorse depicted in FIG. 14.

The first and second leg assemblies 222 and 224 are almost identical, so only the first leg assembly 222 will be described herein in detail. The second leg assembly 224 will be described below only to the extent that it differs from the assembly 222. The first leg assembly 222 comprises an outer leg member 234*a*, an inner leg member 236*a*, a brace assembly 238*a*, an inner hinge member 240*a* (FIGS. 15,18), an outer hinge member 242*a* (FIGS. 15,18), a mounting plate 244*a*, and a pin member 246*a* (FIG. 18).

The inner hinge member 240*a* is welded to an upper end of the inner leg member 236*a*, and the outer hinge member 242*a* is welded to an upper end of the outer leg member 234*a*. The hinge members 240*a* and 242*a* are hollow cylinders having the same inner and outer diameters.

As best shown in FIG. 18, the pin member 246*a* has an outer diameter that is slightly less than the inner diameter of the hinge members 240*a* and 242*a*. To obtain the first leg assembly 222, the pin member 246*a* is inserted into the inner and outer hinge members 240*a* and 242*a*. This arrangement allows the hinge members 240*a*, 242*a*, and 246*a* to form a hinge assembly 248*a*. In general, one or both of the leg members 134*a* and 136*a* can be rotated relative to the other about an axis D defined by the longitudinal axis of the pin member 246*a*.

In the exemplary hinge assembly 248*a*, the mounting plate 244*a* comprises first and second flange portions 250*a* and 252*a* and a central portion 254*a*. In the exemplary mounting plate 244*a*, the flange portions 250*a* and 252*a* extend at right angles from the central portion 254*a*. These flanges 250*a* and 252*a* are spaced from each other a distance slightly greater than the combined lengths of the inner hinge member 240*a* and the outer hinge member 242*a*. The pin member 246*a* is, in the exemplary hinge assembly 248*a*, slightly longer than the distance between the two flange portions 250*a* and 252*a*. Holes 256*a* and 258*a* are formed in the flanges 250*a* and 252*a*.

To form the hinge assembly 248*a*, the inner and outer hinge members 240*a* and 242*a* are arranged between the flange portions 250*a* and 252*a* with their center axes aligned. The pin member 246*a* is then inserted through the holes 256*a* and 258*a* such that it passes through the center cavities of the inner and outer hinge members 242*a* and 242*b*.

At this point, or earlier in the process if convenient, first, second, third, and fourth welds are formed as indicated by reference characters 260, 262, and 264. The weld 260 fixes one end of the pin member 246*a* to the flange 250*a*. The weld 262 fixes the other end of the pin member 246*a* to the flange 252*a*. The weld 240*a* fixes the inner hinge member 240*a* relative to the innermost flange 250*a*.

These welds 260, 262, and 264 fix the mounting plate 240*a*, inner hinge member 240*a*, and pin member 246*a* relative to each other, but allow the outer hinge member 242*a* to rotate about the axis D relative to these members 240*a*, 244*a*, and 246*a*.

Figure 16:
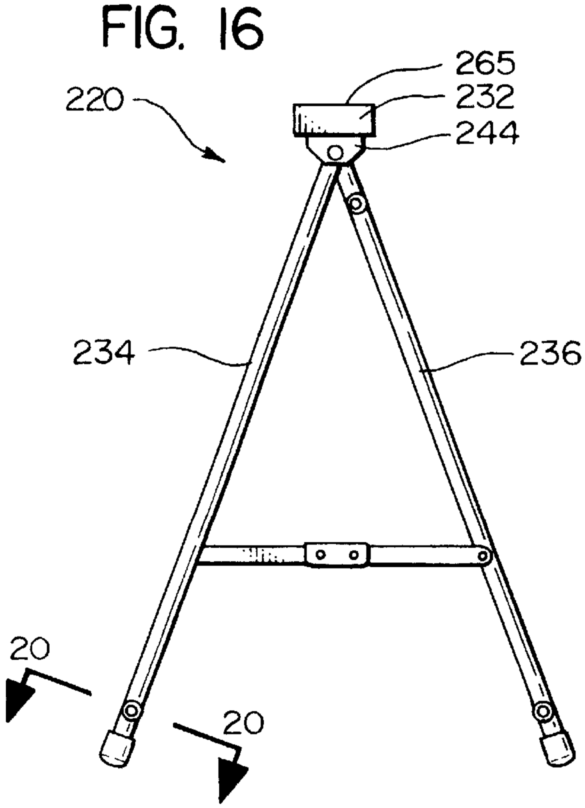
FIGS. 16 and 17 are end elevational views of the sawhorse depicted in FIG. 14, with the sawhorse being in its operational configuration in FIG. 16 and in its intermediate, or storage, configuration in FIG. 17.
Figure 17:
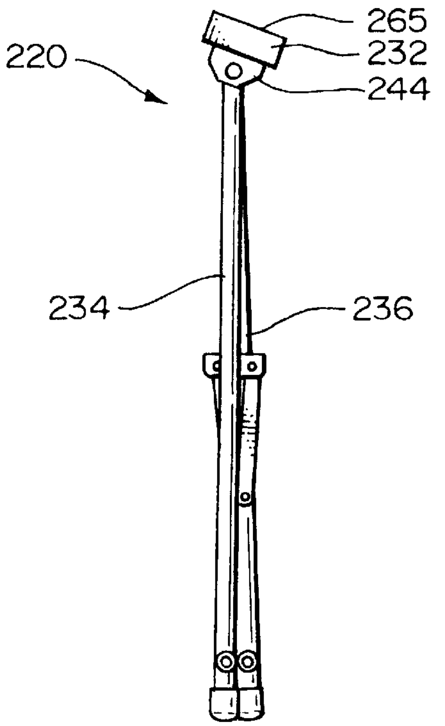

As shown in FIGS. 16 and 17, the hinge assemblies allow the sawhorse 220 to rotate between an operational configuration (FIG. 16) and an intermediate configuration (FIG. 17).

FIG. 17 shows that the mounting plates 244 are welded to the outer hinge members 242 such that these plates 244 extend at an angle with respect to the longitudinal axes of the outer leg members 234. This ensures that a support surface 265 on the cutting board 232 is substantially horizontal when the sawhorse 220 is placed in its operational configuration on a horizontal surface.

The same general procedure described above relating to the assembly of the sawhorse 120 from its fully disassembled configuration to its assembled configuration is followed for the sawhorse 220.

In particular, the brace members 226 and 230 are attached to the leg members 236*a* and 236*b* to form a first rigid assembly 266*a*, and the brace member 228 is attached to the leg members 234*a* and 234*b* to form a second rigid assembly 266*b*. As the hinge assemblies 248*a* and 248*b* are preformed, the rigid assemblies 266*a* and 266*b* can be formed in any order. Screws 268 are then driven through corresponding holes in the mounting plate 244*a* into the cutting board 232.

Figure 19:
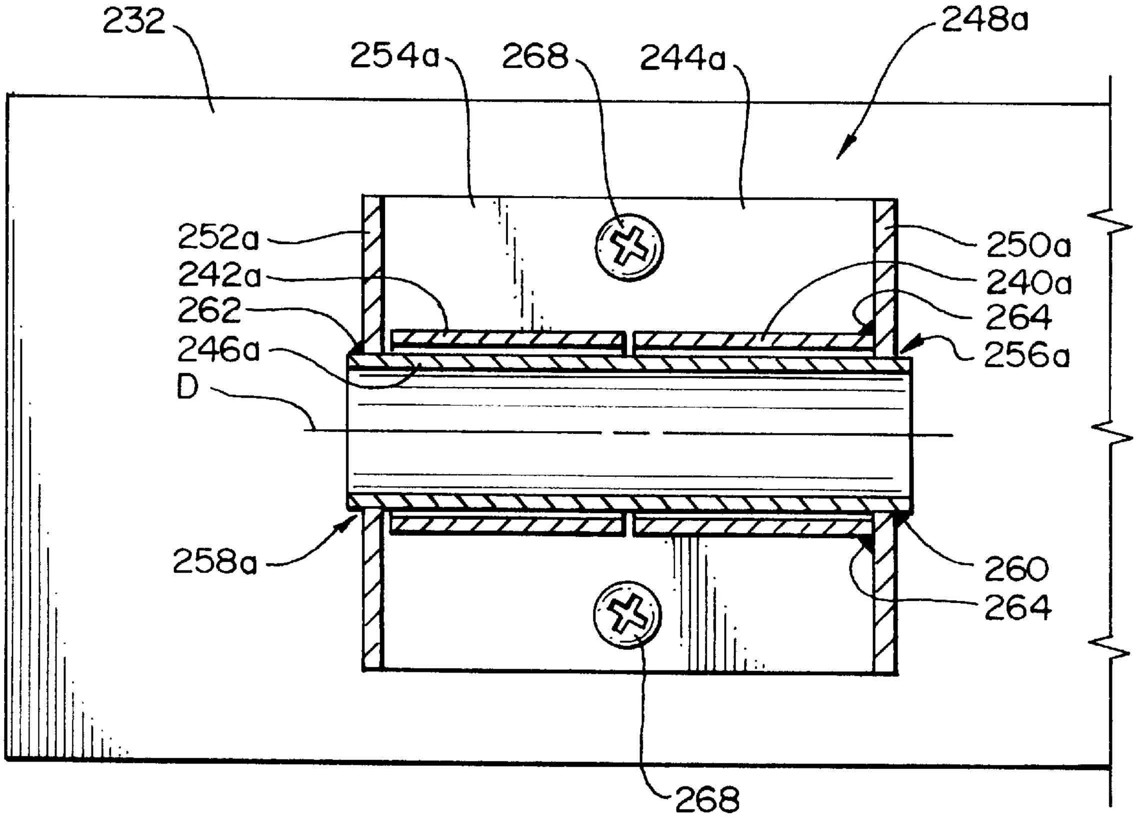
FIG. 19 is a section view of a fastener assembly taken along lines 20—20 in FIG. 16.
Figure 20:
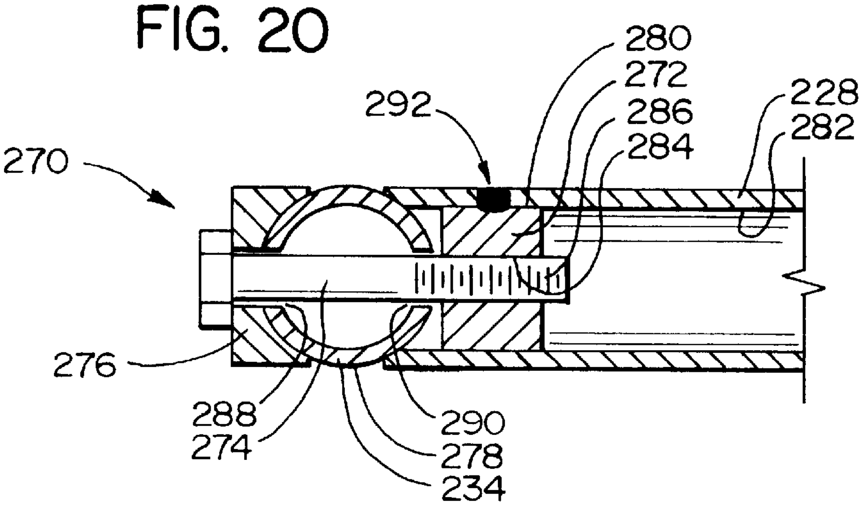

Referring for a moment to FIG. 19, it can be seen that an optional attachment assembly 270 may be used in place of the attachment assembly 150 described above.

The attachment assembly 270 comprises a cylindrical threaded block 272, a bolt 274, and a spacer 276. As perhaps is best shown in FIG. 13, the ends of the leg spacers 226, 228, and 230 are cut such that they conform to a cylindrical outer surface 278 of the leg members 234 and 236.

The block 152 has a cylindrical outer surface 280 sized and dimensioned to be snugly received within a cylinder defined by an inner surface 282 of the leg spacer 230. The block 152 further comprises a threaded inner surface 284 adapted to engage a threaded portion 286 of the bolt 274. Holes 288 and 290 are formed in the leg member 236 at the location where the leg brace 230 is to be attached thereto. A weld is formed at a location identified by reference character 292 to secure the block 272 within the leg member 230.

Accordingly, the attachment assembly 270 operates in the same basic manner as the attachment system 150 described above, with the primary difference being that the spacer 276 is substituted for the washer 156. The spacer 276 will distribute the loads applied by the bolt 274 onto the leg member 234 over a wider area.

It should be clear from the foregoing that the present invention may be embodied in other specific forms without departing from the essential characteristics thereof. The present embodiments are therefore to be considered in all respects as illustrative and not restrictive, the scope of the invention being indicated by the appended claims rather than by the foregoing description; all changes which come within the meaning and range of equivalency of the claims are therefore intended to be embraced therein.

TABLE 1

| | PREFERRED | FIRST PREF. RANGE | SECOND PREF. RANGE |
|---|---|---|---|
| $l_1$ | 35½" | 30"–40" | 24"–48" |
| $l_2$ | 34" | 28½"–38½" | 22½"–46½" |
| $l_3$ | 27¾" | 28"–32½" | 16"–41" |
| $l_4$ | 29⅞" | 22½"–47⅞" | 22½"–55⅞" |
| $l_5$ | 9½" | 8"–10" | 8"–13½" |
| $l_6$ | 14¾" | 12"–15" | 12"–20" |
| $t_1$ | ¾" ID | ½"–1" | — |
| $t_2$ | ½" ID | ½"–1" | — |
| $t_3$ | ¾" ID | ¾"–1¼" | — |

TABLE 2

| ELEMENT | PREFERRED | ALTERNATES |
|---|---|---|
| 46–56 | 18 gauge EMT | 18 gauge steel tube; 16 gauge steel tube; structural steel square tube |

TABLE 2-continued

| ELEMENT | PREFERRED | ALTERNATES |
|---|---|---|
| 34 | 18 gauge EMT | 18 gauge steel tube; 16 gauge steel tube; structural steel square tube |
| 32 | 18 gauge EMT | 18 gauge steel through schedule 40 pipe according to AISC specification manual; structural steel square tube |
| 74–80 | polypropylene plastic | gum rubber |

I claim:

1. A folding sawhorse for supporting a workpiece on a cutting surface, comprising:

first, second, third, and fourth leg members each having an upper end and a lower end;

first, second, third, and fourth separate hinge members rigidly attached to upper ends of the first, second, third, and fourth leg members, respectively;

a plurality of spacing members, where at least one spacing member is connected between the first and fourth leg members to form a first rigid structure and at least one spacing member is connected between the second and third leg members to form a second rigid structure;

a cutting member fastened to at least one of the hinge members, where the cutting surface is formed by a surface of the cutting member; and at least one locking assembly extending between the first and second rigid structures; wherein the first hinge member cooperates with the second hinge member to form a first hinge assembly;

the third hinge member cooperates with the fourth hinge member to form a second hinge assembly;

the first and second hinge assemblies allow the first rigid structure to rotate relative to the second rigid structure about a hinge axis between a first position and a second position;

the locking assembly allows the first and second rigid structures to be selectively locked in the first position or unlocked such that they may be rotated from the first position into the second position;

the second and third hinge members are received within the first and fourth hinge members to form the first and second hinge assemblies, respectively;

the first, second, third, and fourth hinge members are substantially horizontal when assembled to form the first and second hinge assemblies; and the second and third hinge members have an external diameter of a first predetermined dimension and the first and fourth hinge members have an internal diameter of a second predetermined dimension, where the first predetermined dimension is slightly smaller than the second predetermined dimension and the second and third hinge members extend at least partially into the first and third hinge members, respectively, to form the first and second hinge assemblies.

2. A folding sawhorse as recited in claim 1, further comprising first and second mounting plates rigidly attached to the first and fourth hinge members, respectively, where fasteners are passed through the mounting plates to attach the cutting member to the first and fourth hinge members.

3. A folding sawhorse as recited in claim 1, in which first, second, and third spacing members are spaced at least a predetermined spacing distance from the cutting board, where the predetermined spacing distance is selected to minimize a possibility that a blade will penetrate the cutting board and come into contact with the spacing members.

4. A folding sawhorse as recited in claim 1, in which:

the leg members are welded to the hinge members;

the spacing members are bolted to the leg members; and the locking members are riveted to the leg members.

5. A method of providing a work surface for supporting a workpiece, comprising the steps of:

providing first, second, third, and fourth separate hinge members, where the second and third hinge members have and external diameter of a first predetermined dimension and the first and fourth hinge members have an internal diameter of a second predetermined dimension, where the first predetermined dimension is slightly smaller than the second predetermined dimension;

providing first, second, third, and fourth leg members;

forming a first leg assembly by rigidly attaching the first hinge member to the first leg member and the second hinge member to the second leg member;

forming a second leg assembly by rigidly attaching the third hinge member to the third leg member and the fourth hinge member to the fourth leg member;

providing first, second, and third spacing members;

providing first and second locking assemblies;

providing a cutting board;

forming a first hinge assembly by displacing the second hinge member within the first hinge member, where the first and second hinge members are substantially horizontal when the first hinge assembly is in use;

connecting the first locking assembly between the first and second leg members to form a first leg assembly;

forming a second hinge assembly by displacing the third hinge member within the fourth hinge member, where the third and fourth hinge members are substantially horizontal when the second hinge assembly is in use;

connecting the second locking assembly between the third and fourth leg members to form a first leg assembly;

bolting the first and third spacing members to the second and third leg members to form a first rigid assembly;

bolting the second spacing member to the first and fourth leg members to form a second rigid assembly; and attaching the cutting board to the first and fourth hinge members.

6. A method as recited in claim 5, further comprising the steps of:

providing first and second plate members;

attaching the first plate member to the first hinge member;

attaching the second plate member to the fourth hinge member; and fastening the cutting board to the first and second plate members.

* * * * *